US011359992B2

(12) United States Patent
Oser et al.

(10) Patent No.: US 11,359,992 B2
(45) Date of Patent: Jun. 14, 2022

(54) COILED TUBING INJECTOR TEST FIXTURE

(71) Applicant: Halliburton Energy Services, Inc., Houston, TX (US)

(72) Inventors: Michael Stephen Oser, Frisco, TX (US); Robert Eugene Domann, Duncan, OK (US); Mickie James Theriot, Chauvin, LA (US); Harley Wayne Jones, II, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 255 days.

(21) Appl. No.: 16/680,832

(22) Filed: Nov. 12, 2019

(65) Prior Publication Data

US 2021/0140847 A1 May 13, 2021

(51) Int. Cl.
*E21B 19/22* (2006.01)
*G01M 5/00* (2006.01)
*E21B 19/08* (2006.01)
*E21B 47/00* (2012.01)

(52) U.S. Cl.
CPC ............ *G01M 5/0058* (2013.01); *E21B 19/08* (2013.01); *E21B 19/22* (2013.01); *E21B 47/00* (2013.01)

(58) Field of Classification Search
CPC .......... E21B 19/08; E21B 19/22; E21B 47/00; G01M 5/0058
See application file for complete search history.

(56) References Cited

U.S. PATENT DOCUMENTS

| 4,090,625 | A | * | 5/1978 | Walters | .................. B66C 23/48 |
| | | | | | 414/743 |
| 5,975,203 | A | * | 11/1999 | Payne | ..................... E21B 19/22 |
| | | | | | 166/77.1 |
| 7,404,443 | B2 | | 7/2008 | Patton et al. | |
| 2011/0005768 | A1 | | 1/2011 | Coles | |
| 2011/0048693 | A1 | | 3/2011 | Wood | |

(Continued)

FOREIGN PATENT DOCUMENTS

WO    WO-2017146697 A1    8/2017

OTHER PUBLICATIONS

Korean Intellectual Property Office, International Search Report and Written Opinion, PCT/US2019/060860, dated Aug. 11, 2020, 15 pages, Korea.

*Primary Examiner* — Cathleen R Hutchins
*Assistant Examiner* — Ronald R Runyan
(74) *Attorney, Agent, or Firm* — Haynes and Boone, LLP

(57) ABSTRACT

A coiled tubing system includes a coiled tubing unit with a coiled tubing string carried by the unit, the coiled tubing string having a stinger end; an injector support frame having an upper and lower ends; a coiled tubing injector disposed at the upper end of the support frame and engaging the coiled tubing string; and a loading device supported between the coiled tubing injector and the lower end of the frame, the loading device attached to the stinger end of the coiled tubing string. The system may include a riser tube disposed between the upper end of the frame and the loading device, coupling a housing of the loading device to a base of the coiled tubing injector, the coiled tubing string extending through the riser. The system may include a support device supporting the loading device, the support device pivotally supporting the loading device relative to the frame.

20 Claims, 13 Drawing Sheets

(56) References Cited

U.S. PATENT DOCUMENTS

| | | | |
|---|---|---|---|
| 2013/0175048 A1* | 7/2013 | Goode | E21B 19/22 |
| | | | 166/379 |
| 2015/0101799 A1* | 4/2015 | Steffenhagen | E21B 19/22 |
| | | | 166/250.01 |
| 2017/0044847 A1 | 2/2017 | Pinckard | |
| 2018/0100358 A1* | 4/2018 | Shampine | E21B 17/01 |

* cited by examiner

COILED TUBING INJECTOR TEST FIXTURE

TECHNICAL FIELD OF THE INVENTION

The disclosure relates, in general, to hydrocarbon production, and more particularly, to coiled tubing injectors utilized in the production of hydrocarbons. Most particularly, the disclosure relates to a coiled tubing injector test fixture and method for testing a coiled tubing injector at a coiled tubing field location.

BACKGROUND OF THE INVENTION

Coiled tubing units are often used for common well-intervention applications including workover, re-entry drilling, reservoir stimulation, and recompletion. Coiled tubing injectors are used in the production of hydrocarbons such as oil and gas for running and retrieving a coiled tubing string from a wellbore.

Through normal use, coiled tubing injectors break down in the field and require repair or rebuild. A repaired or rebuilt coiled tubing injector should be tested prior to being placed back in service. Typically, testing would require the use of a test well and a coiled tubing string to test the injector's repair integrity. Although the injector and tubing are readily available for testing in the field, a test well is not, and therefore, the injector is typically transported to a facility with a test well. Moreover, even a test well may be limited in its effectiveness since applying enough force on the coiled tubing string to simulate an actual well may not be possible without making modifications to the coiled tubing string.

In some cases, there is a need for a coiled tubing injector test fixture for field operations to simulate a well setup to test a repaired or rebuilt coiled tubing injector.

BRIEF DESCRIPTION OF THE DRAWINGS

For a more complete understanding of the present disclosure and the advantages thereof, reference is now made to the following brief description, taken in connection with the accompanying drawings and detailed description.

DETAILED DESCRIPTION OF THE EMBODIMENTS

Disclosed herein are embodiments of a coiled tubing injector test fixture for field operations to simulate a well setup to test a repaired or rebuilt coiled tubing injector. The test fixture may apply realistic coiled tubing loads to the coiled tubing injector to simulate an actual well. The test fixture may test a coiled tubing injector at full speed, whereas pulling on a static pipe or bar without rotating a chain of the coiled tubing injector, may not. The test fixture may test a coiled tubing injector at full load under realistic operational conditions without the need for a test well. The test fixture may apply greater loads on the coiled tubing string than is possible using a test well. The test fixture may be installed at any coiled tubing field location and may be used during all aspects of coiled tubing injector maintenance. The test fixture may be portable for set up and testing at the field location and reducing time for verification testing. A control system may provide greater flexibility for loading the coiled tubing injector than is available on a test well since changing loads in the test well may require stacking drill collars on the coiled tubing string. The test fixture may reduce an amount of coiled tubing subject to fatigue loading while testing.

Figure 1:
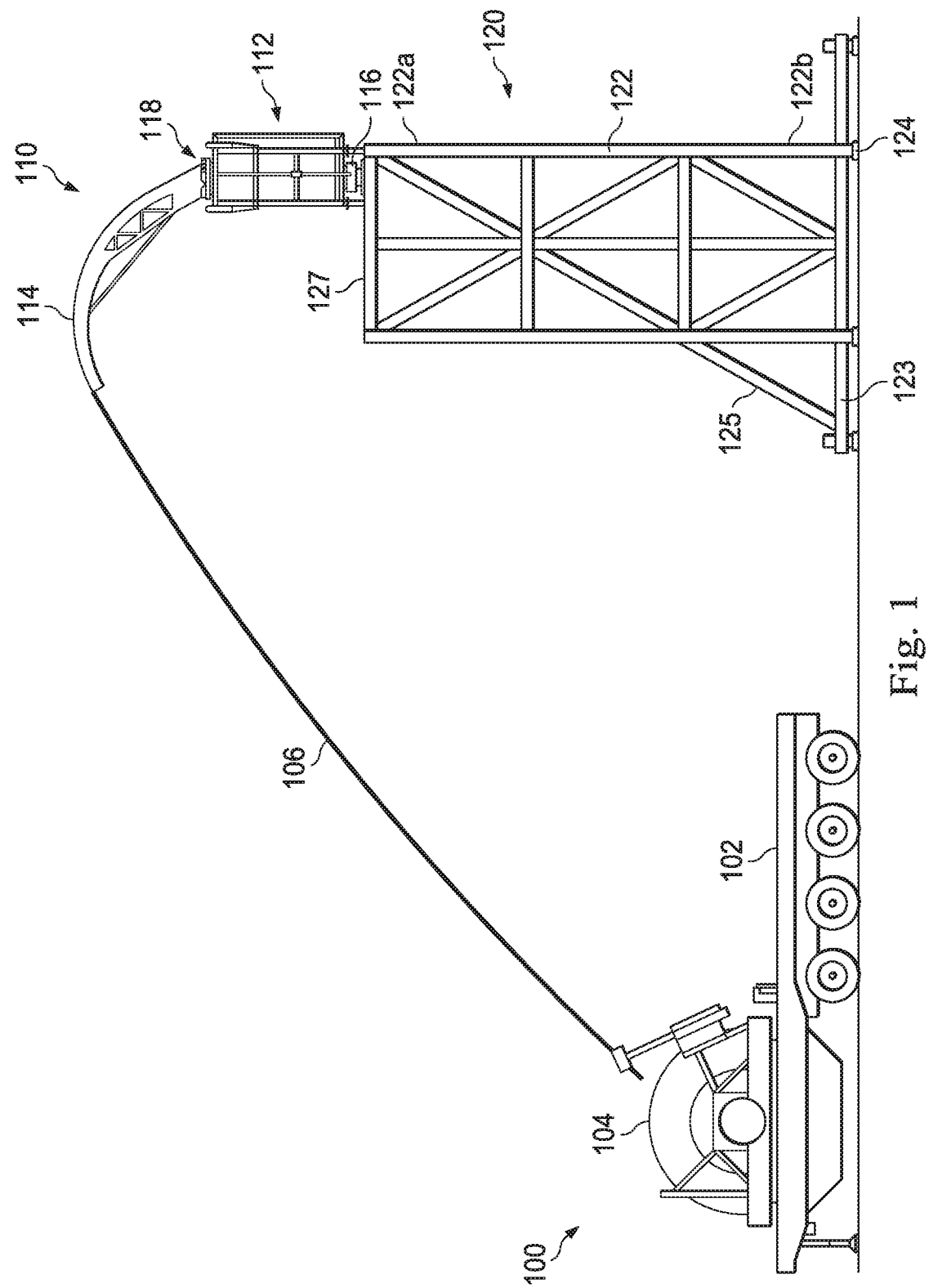
FIG. 1 is an elevation view of a coiled tubing unit, a coiled tubing injector, and a simplified test fixture according to some embodiments.

In FIG. 1, is an elevation view of a coiled tubing unit, a coiled tubing injector, and a simplified test fixture. Specifically, shown is a coiled tubing unit 100 positioned at a coiled tubing field location. The coiled tubing unit 100 includes a coiled tubing trailer 102 for transporting a coiled tubing reel 104. The coiled tubing reel 104 stores a coiled tubing string 106 during transport, injection, use, and retrieval of the coiled tubing string 106 during any test, job, or operation. The coiled tubing reel 104 includes a high-pressure swivel joint (not shown) to pump fluid through the coiled tubing string 106 while the coiled tubing reel 104 rotates during installation or retrieval of the coiled tubing string 106. As used herein, coiled tubing unit 100 may generally refer to any equipment for transporting, storing, and/or using the coiled tubing string 106 at a field location, wellsite, test site, or any other hydrocarbon production location or facility.

A coiled tubing injector 110 is used to move the coiled tubing string 106 on and off the coiled tubing reel 104. In one or more embodiments, the coiled tubing injector 110 includes an injector head 112, a gooseneck 114, and a hydraulic drive system 118. The hydraulic drive system 118 drives a counter rotating profiled chain assembly (not shown) to grip and either lift or lower the coiled tubing string 106. In one or more embodiments, the coiled tubing injector 110 is disposed on a test fixture 120. As used herein, test fixture 120 may generally refer to any type of stand, structure, tower, or building having a structural frame 122 supporting the coiled tubing injector 110 and test equipment of the test fixture 120. Thus, in some embodiments, structural frame 122 is a tower. In any event, structural frame 122 is provided to apply test forces and reel tension to coiled tubing injector 110 and tubing string 106. Structural frame 122 may provide one or more work platforms and ladders for personnel to access the coiled tubing injector 110 and the test equipment. Frame 122 generally has an upper end 122a and a lower end 122b. A work platform 127 may be disposed adjacent the upper end 122a of frame 122.

The test fixture 120 may be free-standing and self-supported against test loads, reel tension, and wind forces, or, alternatively, the test fixture 120 may be stabilized using guy wires or other structures. In some embodiments, the test fixture 120 may include additional temporary or permanent ground fixtures. The ground fixtures may include concrete piles and the test fixture 120 may be bolted down, or the test fixture 120 may be cemented in place. The test fixture 120 may include a portable, partially portable, or fixed structure. The frame 122 may include one or more outriggers 123 including jack stands 124 for stabilizing and leveling the test fixture 120. In some embodiments, the frame 122 may include one or more braces 125. In one or more embodiments, braces 125 are provided at least on a side of the test fixture 120 facing the coiled tubing unit 100 so as to provide additional bracing against tension applied through the coiled tubing string 106 connecting to the coiled tubing reel 104.

Figure 2:
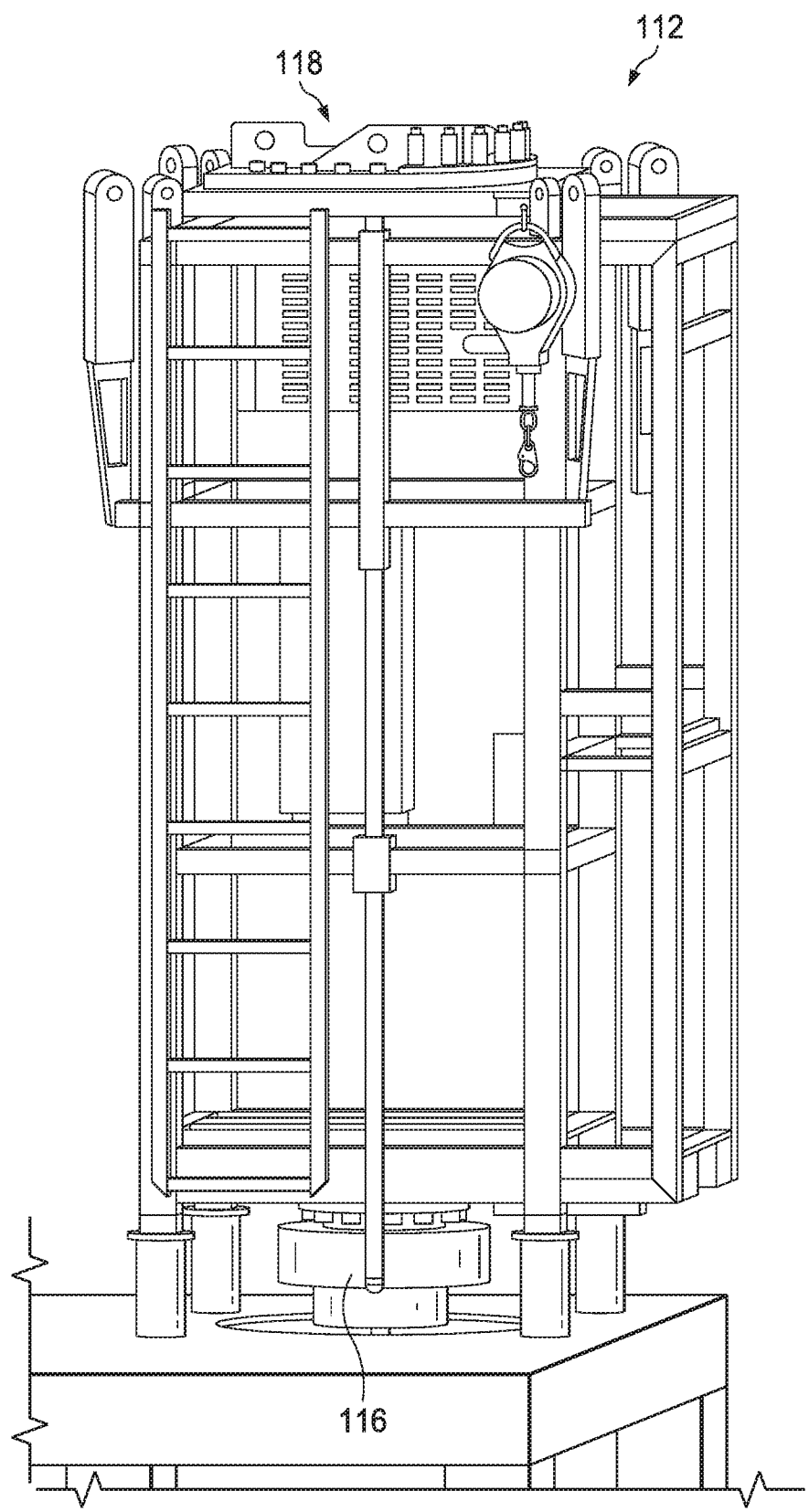
FIG. 2 is a magnified perspective view of an injector head of a coiled tubing injector according to some embodiments.

FIG. 2 is a magnified perspective view of an injector head of a coiled tubing injector, and in particular illustrates coiled tubing injector head 112 in more detail. As shown, injector head 112 includes hydraulic drive system 118 and a connector 116.

Figure 3:
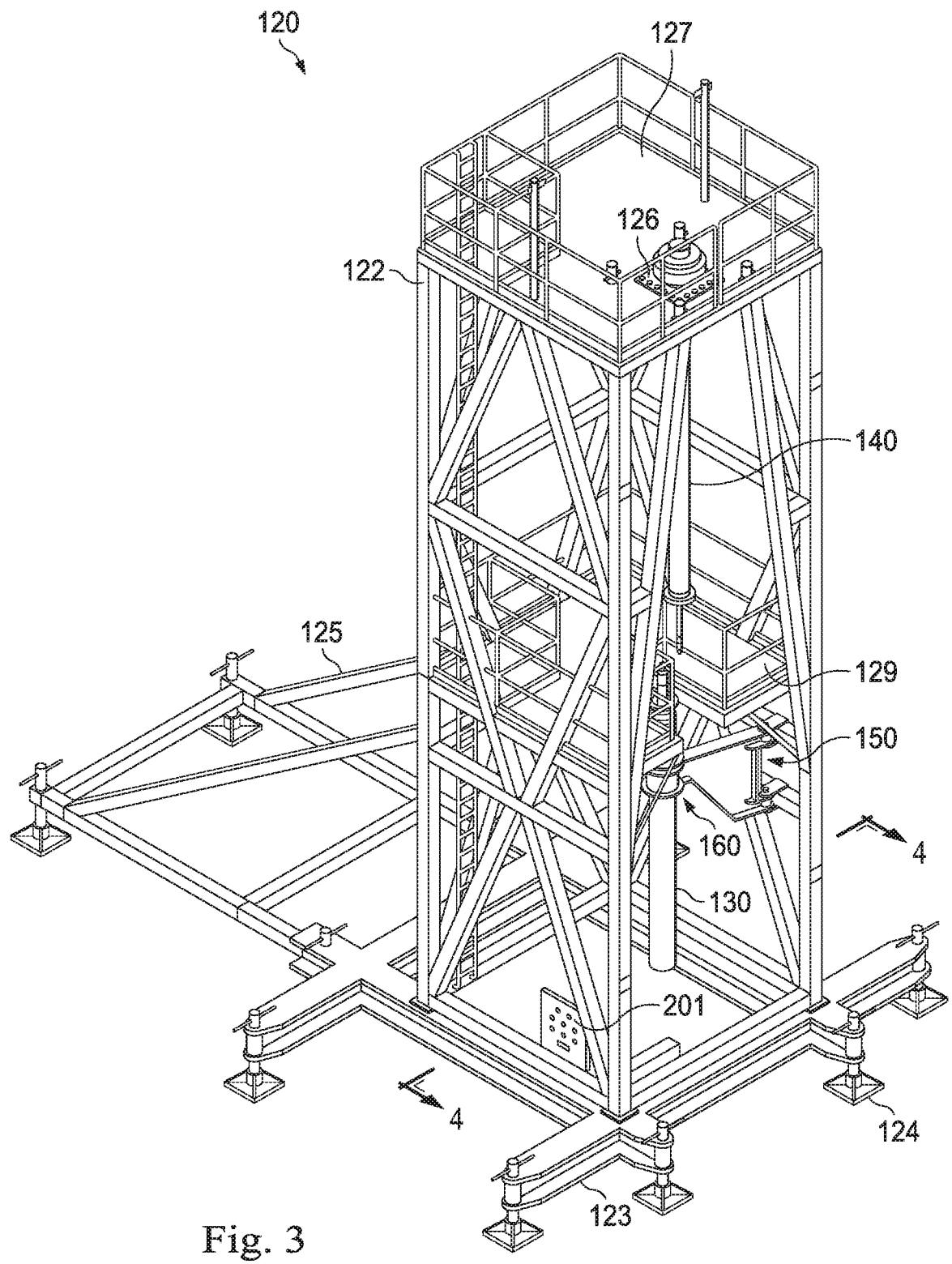
FIG. 3 is a perspective view of a test fixture according to some embodiments.
Figure 4:
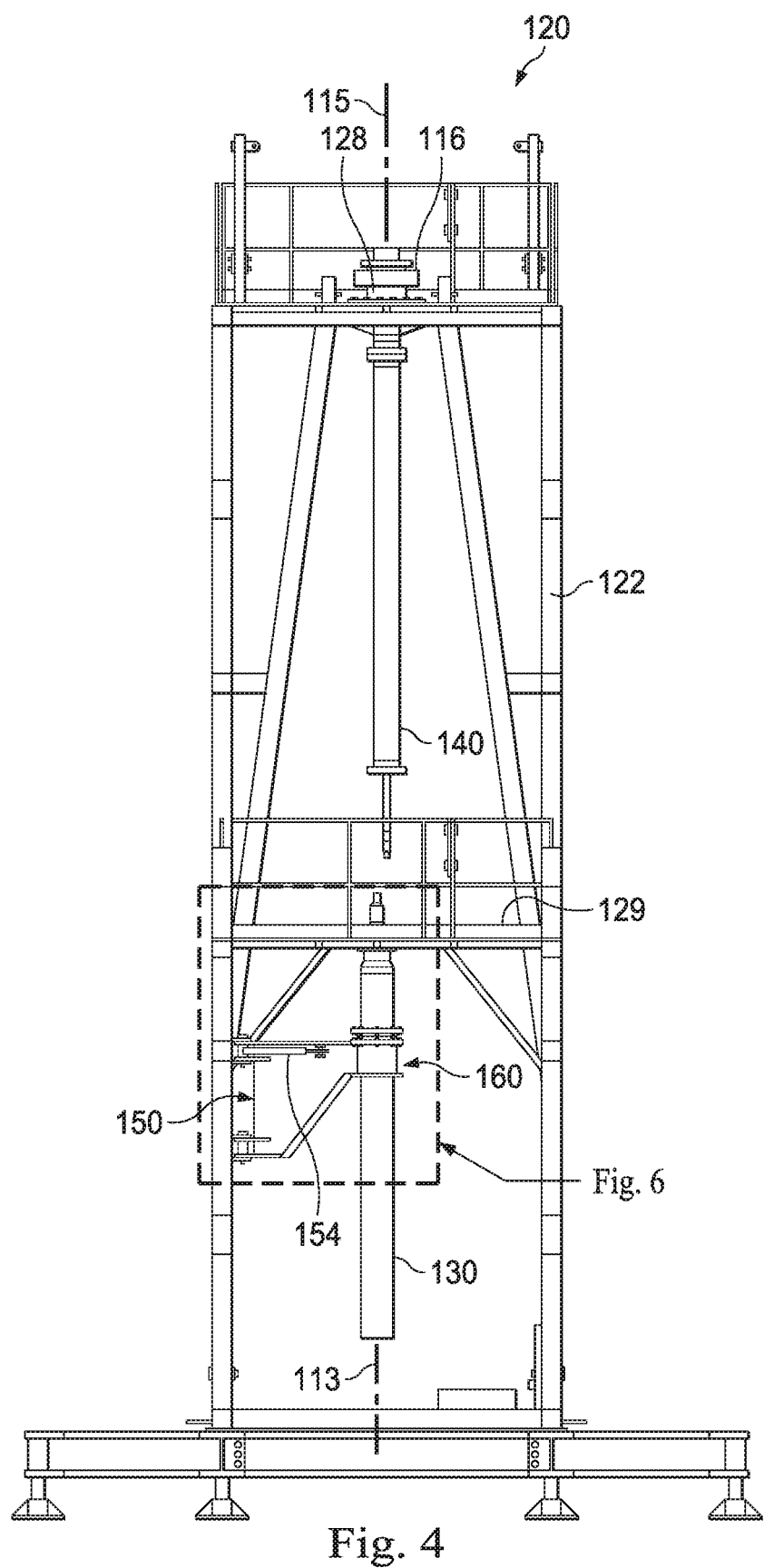
FIG. 4 is a cross-sectional view of the test fixture of FIG. 3 indicated by dashed line A-A'.

With reference to FIGS. 3 and 4, FIG. 3 is a perspective view of a test fixture and FIG. 4 is a cross-sectional view of the test fixture of FIG. 3 indicated by dashed line A-A', both figures illustrating test fixture 120 is shown in more detail. Frame 122 may include an adapter plate 126 disposed on work platform 127. The adapter plate 126 may include an injector connector 128 for engagement by connector 116 of injector head 112 (see FIG. 2). Connector 128 may be welded or otherwise attached to and extending upward from the adapter plate 126 for quick connection and disconnection to the injector connector 116 (see FIG. 2) of the coiled tubing injector head 112. In this way, the coiled tubing injector 110, and in particular, injector head 112 may be coupled to the adapter plate 126 via the injector connectors 116, 128. In some embodiments, the coiled tubing injector 110 may be disposed on the test fixture 120 without using the injector connectors 116, 128. For example, injector head 112 may be bolted or welded to adapter plate 126 or attached by some other mechanism.

Figure 5A:
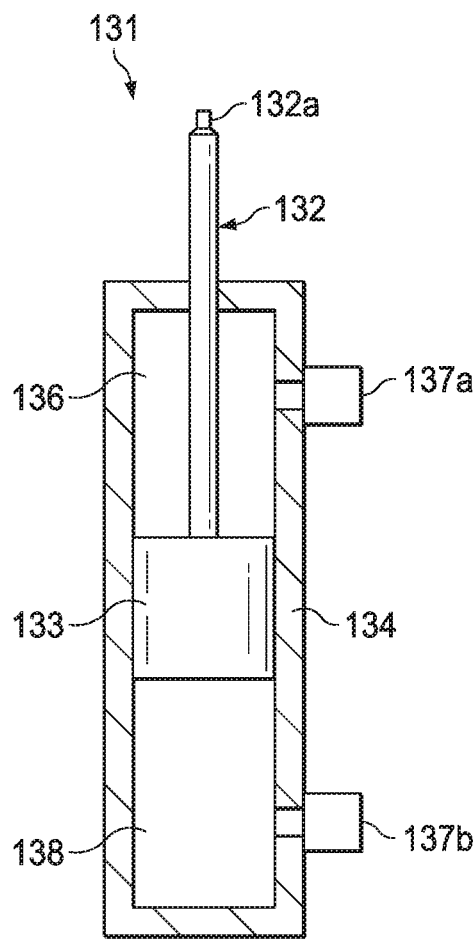
FIG. 5A is a perspective view of a swing arm assembly, a riser tube, and a loading device according to some embodiments.

Test fixture 120 includes a loading device 130 for applying a test load to coiled tubing string 106. As used herein, loading device 130 may generally refer to any type of linear force generator, including any one or more of weights, a hydraulic cylinder, a pneumatic cylinder, an electric linear actuator, or even a winch and pulley system. In one or more embodiments, loading device 130 is elongated and extends along a loading device axis 113. In one or more embodiments, where loading device 130 is a hydraulic cylinder, the embodiment may take the configuration of a fluid cylinder assembly 131, as illustrated in FIG. 5A.

In one or more embodiments, loading device 130 may be supported on a hinged swing arm assembly 150 to allow loading device 130 to be generally aligned under injector head 112 for testing procedures and then pivoted out of the way for other operations, such as where test fixture 120 is installed over a well (not shown). When loading device 130 is aligned under injector head 112 for testing, loading device axis 113 and injector head axis 115 are generally coaxial. Swing arm assembly 150 permits loading device 130 on loading device axis 113 to be pivoted away from injector head axis 115 as desired. The swing arm assembly 150 may include a support device 160 connected thereto for engaging and supporting the loading device 130. Support device 160 may be rotatably attached to swing arm assembly 150 to permit support device 160 to swivel in one or more directions relative to swing arm assembly 150. Likewise, a swing arm piston assembly 154 may be provided and operatively connected between swing arm assembly 150 and test fixture 120 to rotate the swing arm assembly 150 between a first or test position, shown in FIG. 3, where loading device axis 113 is generally coaxial with injector head axis 115 and a second or stowed position, where loading device axis 113 is spaced apart from injector head axis 115.

In one or more embodiments, a riser tube 140 is attached adjacent work platform 127 and extends down from upper end 122a of frame 122 along an injector axis 115. In one or more embodiments, riser tube 140 may attach to adapter plate 126. The coiled tubing string 106 may be disposed within a bore (not shown) of the riser tube 140 so that coiled tubing string 106 generally extends along injector axis 115 as well.

The frame 122 may further include a lower work platform 129 allowing personnel to access and manipulate loading device 130 and riser tube 140 as desired.

FIG. 5A is a perspective view of a swing arm assembly, a riser tube, and a loading device, and in particular illustrates one embodiment of loading device 130 where loading device 130 is a fluid cylinder assembly 131. As shown, fluid cylinder assembly 131 generally includes a piston rod 132 extending from a piston 133 and disposed to slide axially in a housing 134. Piston rod 132 includes a free rod end 132a. A first fluid or rod end chamber 136 is formed in housing 134 on one side of piston 133 and a second fluid or bore end chamber 138 is formed in housing 136 on the opposite side of piston 133. A first fluid port 137a is in fluid communication with first fluid chamber 136 and a second fluid port 137b is in fluid communication with second fluid chamber 138 to introduce a working fluid, such as a pressurized liquid or gas, into the respective chambers 136, 138. For example, a fluid cylinder assembly 131 may be a hydraulic piston in some embodiments and may be a pneumatic piston in other embodiments.

Figure 5B:
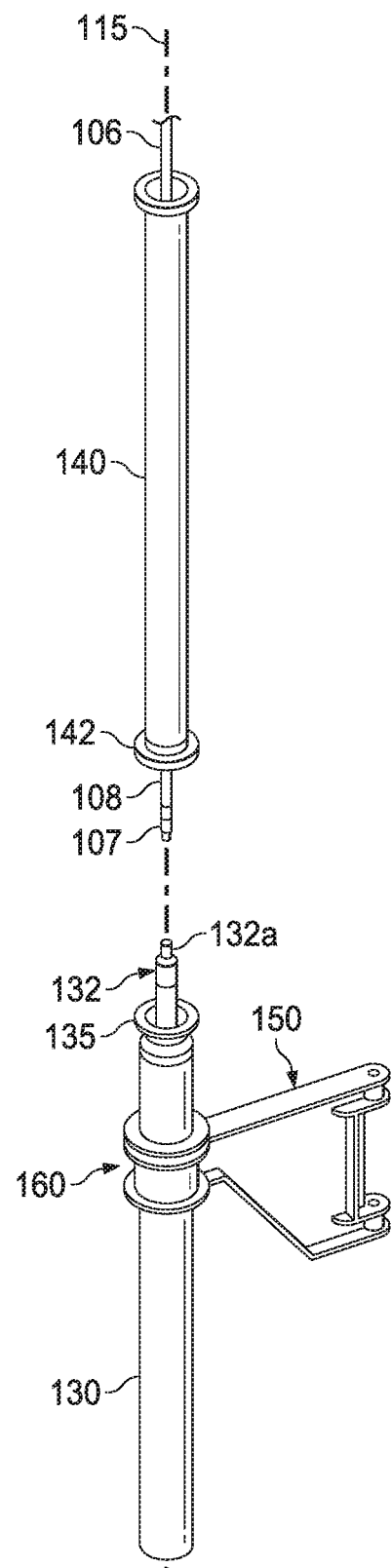
FIG. 5B is a schematic illustration of a fluid cylinder assembly according to some embodiments.

FIG. 5B is a schematic illustration of a fluid cylinder assembly, and in particular illustrates fluid cylinder assembly 131 in conjunction to riser 140 and coiled tubing string 106. As shown, the coiled tubing string 106 extends through riser 140 and terminates at an end 108, referred to as the stinger. Stinger 108 attaches to free rod end 132a of piston rod 132. In one or more embodiments, a coiled tubing connector 107 may be attached to the stinger 108 for facilitating attachment of free rod end 132a to stinger 108. In some embodiments, the coiled tubing connector 107 may be a pin and box (oil field terminology for a male and female threaded connection). In some embodiments, the coiled tubing connector 107 may be roll crimped to the stinger 108 and threaded to the rod 132. The coiled tubing connector 107 may be any other suitable connector known in the art. In any case, in the illustrated embodiment where loading device 130 is a fluid cylinder assembly 131, the coiled tubing string 106 is operatively connected to the rod 132 of the fluid cylinder assembly 131. The coiled tubing string 106 and the loading device 130 may or may not be directly connected. In some embodiments, the connection may include one or more intermediate structures, adapters, or other components. The housing 134 of the loading device 130 may include a housing flange 135 at an upper end thereof for bolting to flange 142 of riser tube 140. Connecting the rod 132, the housing 134, and the riser tube 140 may include bolting, welding, or otherwise affixing.

The riser tube 140 connects the coiled tubing injector 110 to the loading device 130 via the adapter plate 126 (see FIG. 3). In one or more embodiments, the riser tube 140 confines testing loads along a load path stretching between the coiled tubing injector 110 and the loading device 130 via the adapter plate 126. This dedicated testing load path may prevent the frame 122 of the test fixture 120 from experiencing testing loads, which may exceed 100,000 pounds. Thus, the frame 122 of the test fixture 120 may only carry a weight of the coiled tubing injector 110, a weight of the test equipment (at least including the loading device 130 and the riser tube 140), and additional loading due to tension applied through the coiled tubing string 106 connecting to the coiled tubing reel 104. In some embodiments, the frame may only carry a load of 20,000-30,000 pounds. Lower work platform 129 (see FIG. 4) allows access at a height where connections can be made between the coiled tubing connector 107 and the rod 132 and between the riser flange 142 and the housing flange 135.

Figure 6:
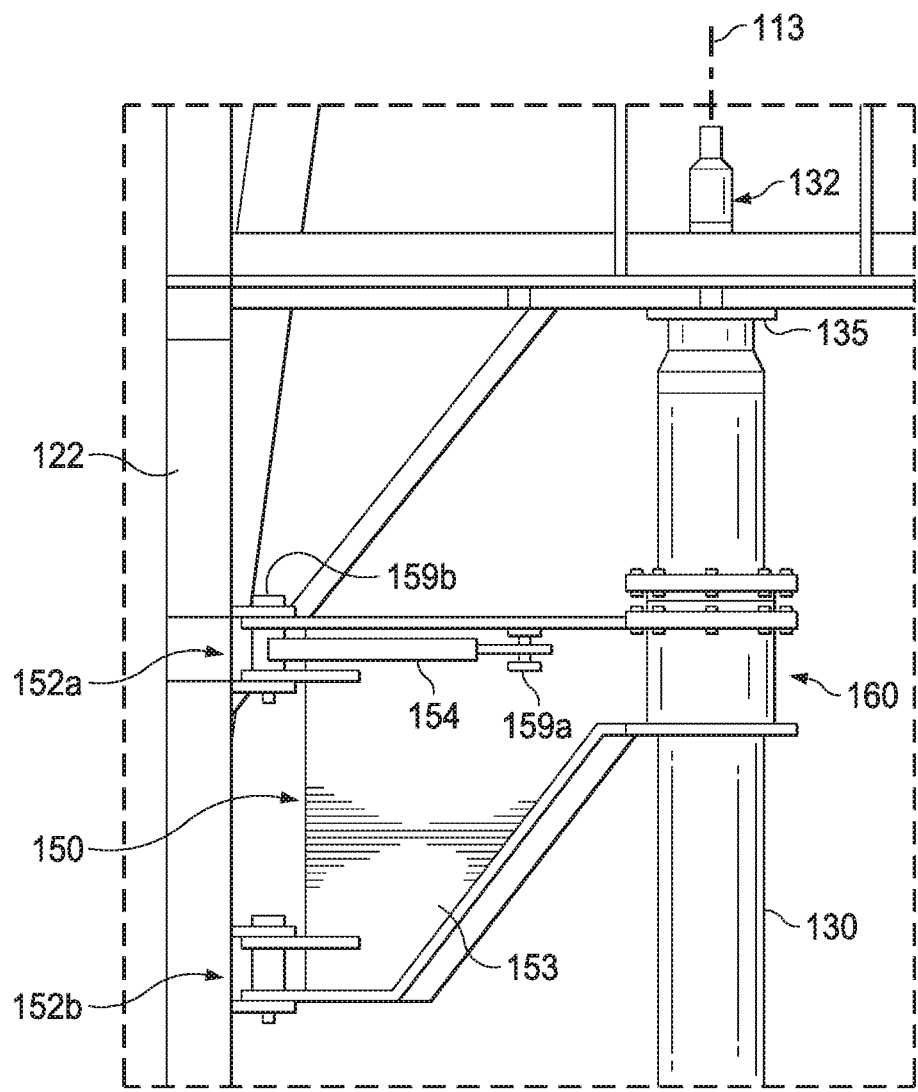
FIG. 6 is a magnified elevation view of the swing arm assembly of FIG. 4 indicated by dashed line B-B'.

Turning to FIG. 6, a magnified elevation view of the swing arm assembly of FIG. 4 indicated by dashed line B-B' is shown, illustrating swing arm assembly 150 of test fixture 120 is shown in more detail. In one or more embodiments, swing arm assembly 150 may include at least one hinge 152 to allow swing arm assembly 150 to pivot relative to frame 122. In one or more embodiments, swing arm assembly 150 may comprise a support structure 153, such as a plate as illustrated, and require multiple hinges 152. Thus, as shown, swing arm assembly 150 may include an upper hinge 152a, spaced apart from a lower hinge 152b. The upper hinge 152a and the lower hinge 152b rotatably connect the swing arm assembly 150 to the test fixture 120 permitting rotation of the swing arm assembly 150 relative to the test fixture 120 about a vertical axis. Upper hinge 152a and lower hinge 152b may be any suitable type of hinge known in the art.

In one or more embodiments, swing arm assembly 150 may include a swing arm piston assembly 154 that operatively connects between the swing arm assembly 150 and the test fixture 120 to control motion of swing arm assembly 150 on hinge(s) 152. In some embodiments, rotation of the swing arm assembly 150 may compensate for lateral misalignment between the housing flange 135 and the riser flange 142 and between the coiled tubing connector 107 and the rod 132.

Figure 8A:
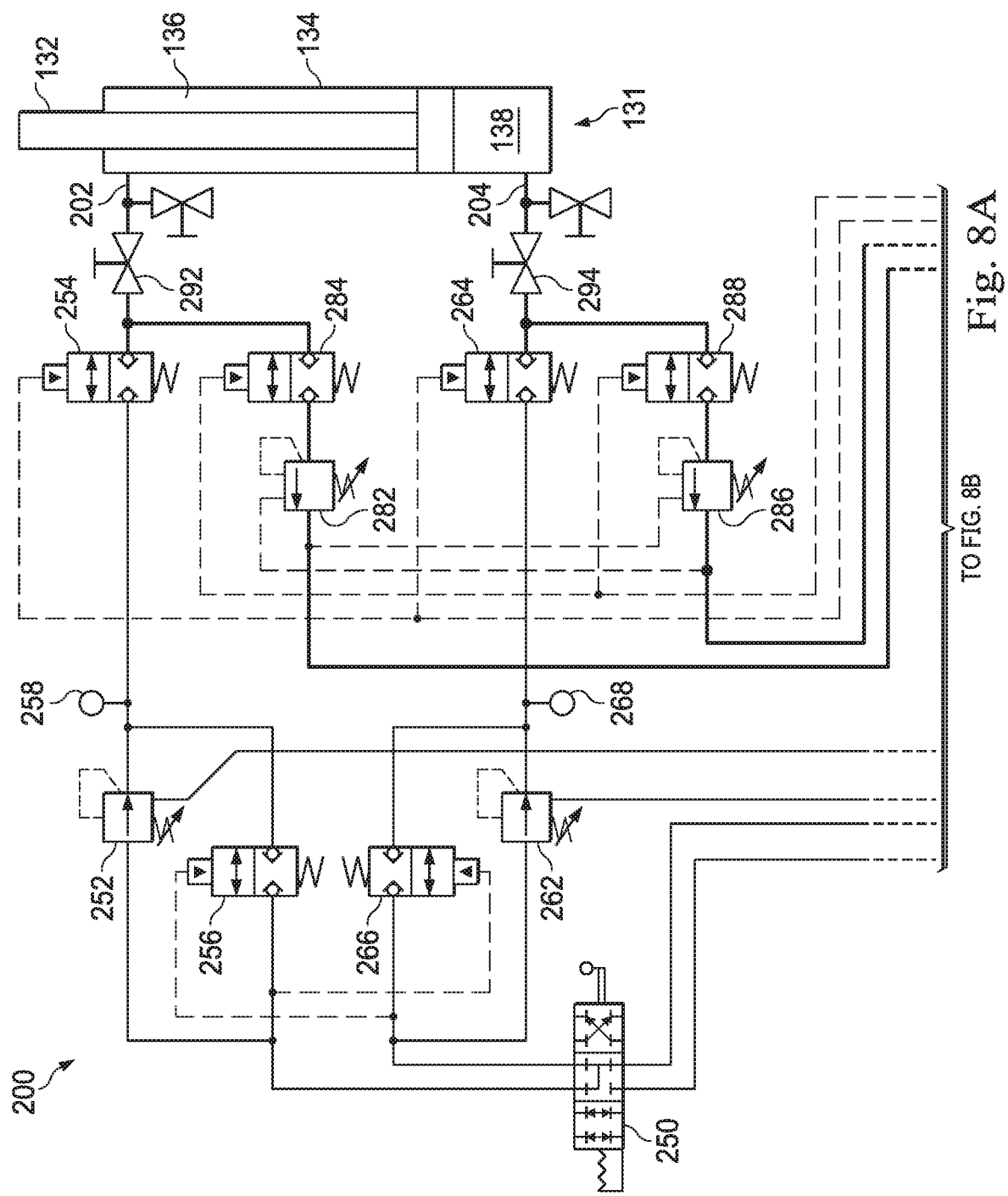
FIGS. 8A and 8B are each a part of a schematic illustration of a control system including a hydraulic circuit for operating a test fixture according to some embodiments.
Figure 8B:
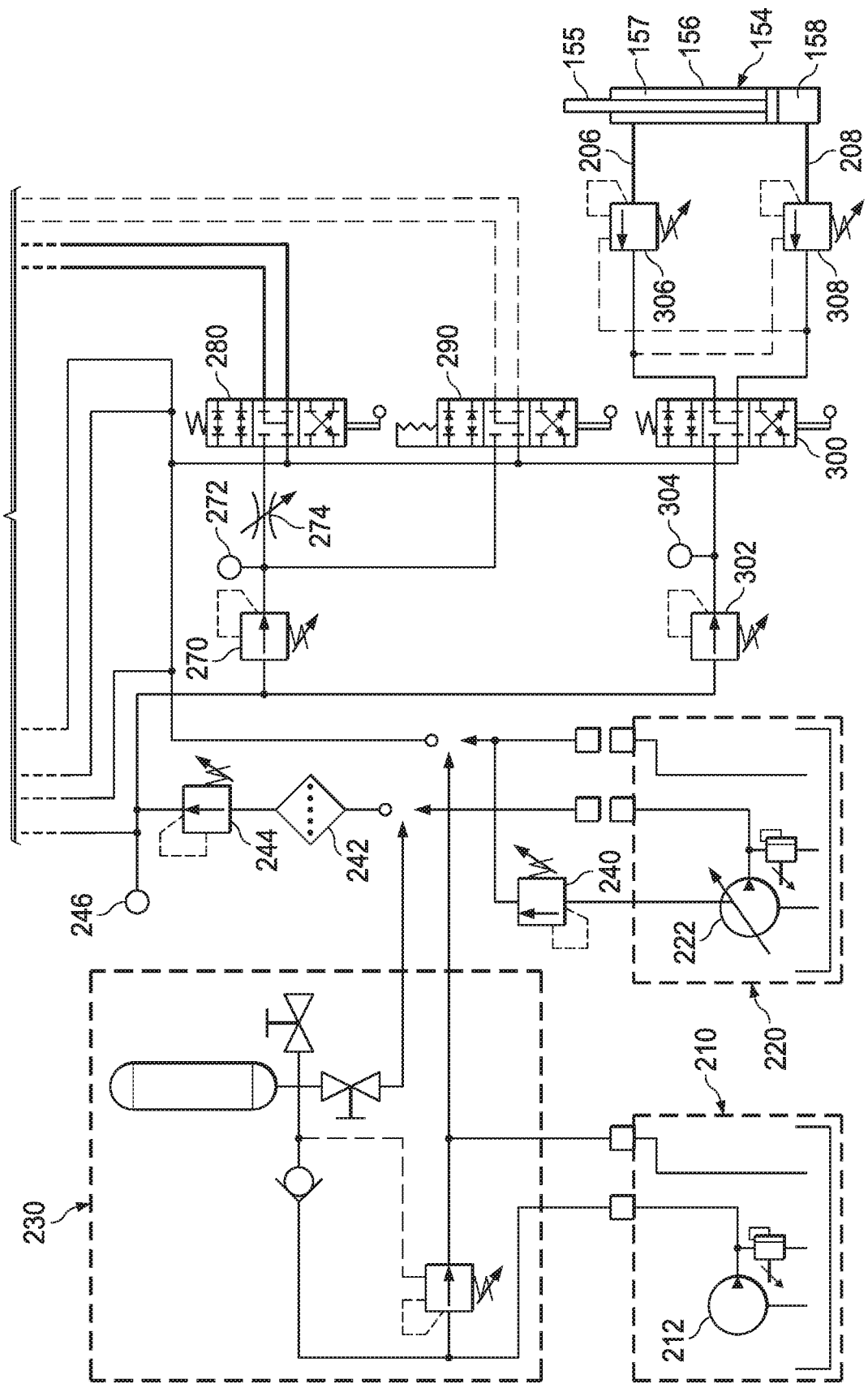

In one or more embodiments, the swing arm piston assembly 154 may be a hydraulic or pneumatic cylinder, as shown schematically in FIG. 8B, including a piston or rod 155, a housing 156, a rod end fluid chamber 157, and a bore end fluid chamber 158. Referring back to FIG. 6, the rod 155 may be connected to the swing arm assembly 150, or a component thereof. The connection between the rod 155 and the swing arm assembly 150 may include a first hinged connection 159a for permitting the swing arm piston assembly 154 to pivot relative to the swing arm assembly 150 as the swing arm assembly 150 rotates. The housing 156 may be connected to the frame 122 of the test fixture 120. The connection between the housing 156 and the frame 122 may include a second hinged connection 159b for permitting the swing arm piston assembly 154 to pivot relative to the frame 122 as the swing arm assembly 150 rotates. In some embodiments, the second hinged connection 159b may connect to a hinge pin of the upper hinge 152a or the lower hinge 152b of the swing arm assembly 150. In other embodiments the second hinged connection 159b may connect directly to the frame 122. In one or more embodiments, an orientation of the swing arm piston assembly 154 may be reversed, wherein the rod 155 may be connected to the frame 122 of the test fixture 120, and the housing 156 may be connected to the swing arm assembly 150, or a component thereof. As used herein, connecting the rod 155 and/or housing 156 to the frame 122 of the test fixture 120 and/or the swing arm assembly 150, or a component thereof, may include bolting, welding, or otherwise affixing directly or indirectly with one or more intervening parts, including one or more hinges. Swing arm assembly 150 may include a support device 160 for engaging and supporting the loading device 130.

Figure 7A:
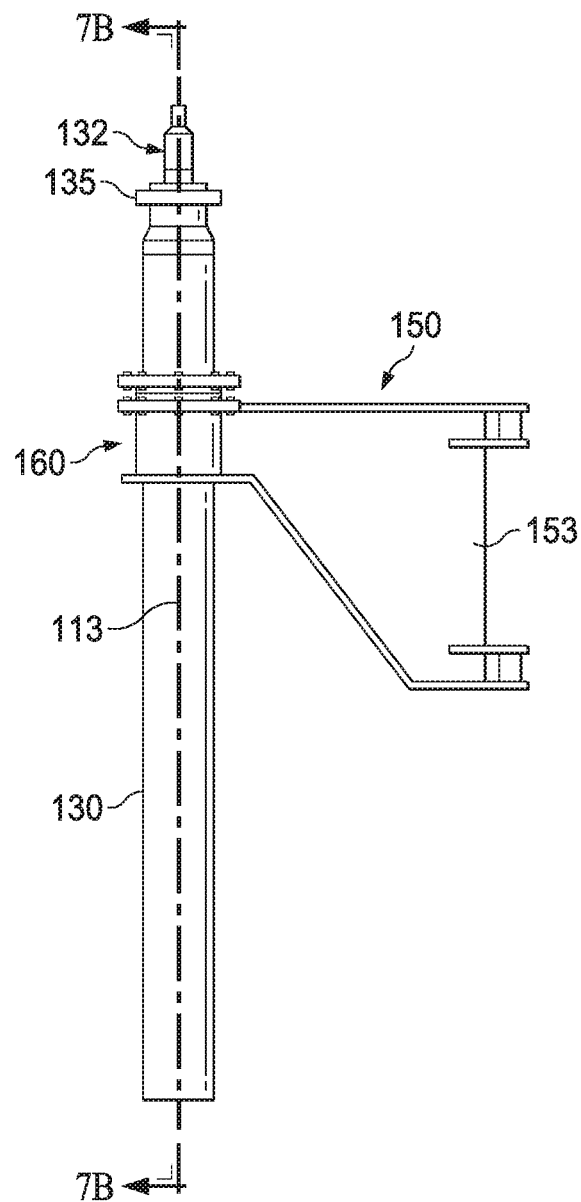
FIG. 7A is an elevation view of a swing arm assembly and a loading device according to some embodiments.
Figure 7B:
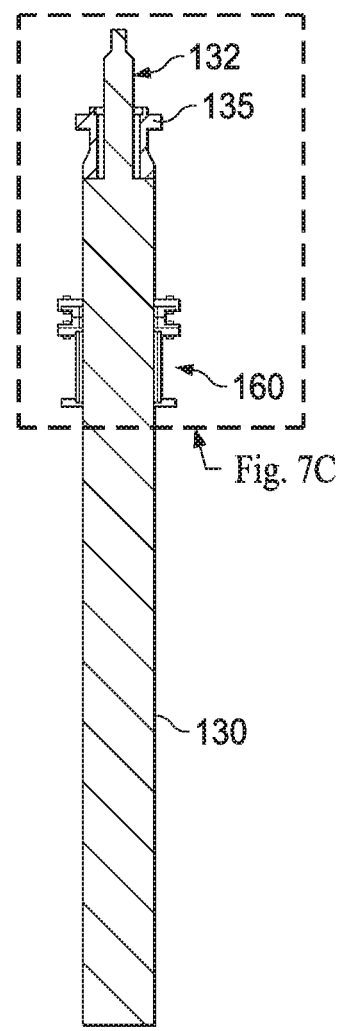
FIG. 7B is a cross-sectional view of the swing arm assembly and the loading device of FIG. 7A indicated by dashed line C-C'.
Figure 7C:
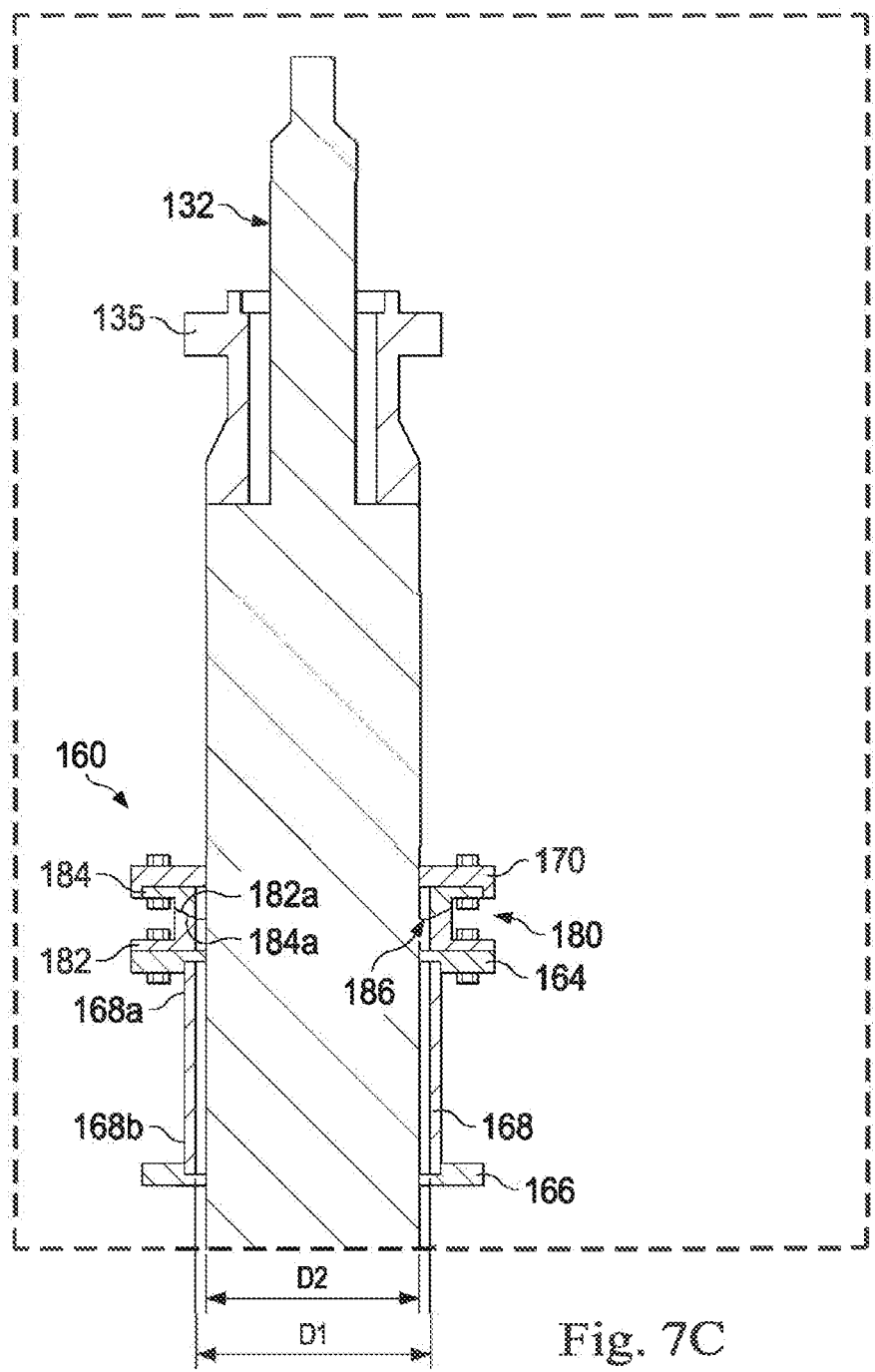
FIG. 7C is a magnified cross-sectional view of a swivel of FIG. 7B indicated by dashed line D-D'.

One or more embodiments of a support device 160 of swing arm assembly 150 are illustrated in more detail in FIGS. 7A-7C. Specifically, FIG. 7A is an elevation view of a swing arm assembly and a loading device, while FIG. 7B is a cross-sectional view of the swing arm assembly and the loading device of FIG. 7A indicated by dashed line C-C'. FIG. 7C is a magnified cross-sectional view of a swivel of FIG. 7B indicated by dashed line D-D'. In some embodiments, the support device 160 engages the housing 134 of the loading device 130 and supports a weight of the loading device 130. The support device 160 may support a weight of the coiled tubing string 106 and a weight of the riser tube 140 before, during, and/or after connecting the riser tube 140 to the loading device 130.

In one or more embodiments, support device 160 may include cylinder 168 coupled to the swing arm assembly 150. Cylinder 168 may be integrally formed as part of swing arm assembly 150 or may be attached thereto. Cylinder 168 extends between a first end 168a and a second end 168b. The support device 160 may further include an upper flange 164 having a first plurality of bolt holes disposed circumferentially about cylinder 168 adjacent the first end 168a, and a lower flange 166 disposed around cylinder 168 adjacent the second end 168b. Cylinder 168 is disposed to receive housing 134 of the loading device 130. In one or more embodiments, cylinder 168 is disposed to receive housing 134 of the loading device 130 without being connected to loading device 130. In such embodiments, cylinder 168 has an inner diameter D1 greater than an outer diameter D2 of the housing 134. The diameter D1 may exceed the diameter D2 by an amount needed to create an annular clearance between cylinder 168 and the housing 134 to allow the loading device 130 to pivot relative to cylinder 168, as described later.

Upper flange 164 of support device 160 is disposed to engage a loading device flange 170. Loading device flange 170 may be directly coupled to an outer surface of the housing 134 of the loading device. In other embodiments, the loading device flange 170 may be coupled to an adapter fitted to the outer surface of housing 134. The loading device flange 170 may attach to the housing 134 and/or the adapter by any suitable mechanism, including without limitation being fabricated as an integral portion of the housing and/or the adapter or by being welded, bolted, friction fit, disposed in a recess of, or otherwise affixed to the housing 134 and/or the adapter. The loading device flange 170 may include a second plurality of bolt holes disposed circumferentially about a longitudinal axis thereof. The loading device flange 170 may be disposed above the upper flange 164, and the longitudinal axis of the loading device flange 170 may align with the longitudinal axis of the upper flange 164.

In one or more embodiments, the support device 160 may include a single- or multi-axis swivel 180 disposed between the upper flange 164 and the loading device flange 170. The swivel 180 may allow the loading device 130 to pivot in one or more directions. Swivel 180 may be any type of swivel known in the art that allows single- or multi-axis rotation, including without limitation a ball and socket joint or a universal joint. Pivoting of the loading device 130 may compensate for axial misalignment between the housing flange 135 and the riser flange 142 and between the coiled tubing connector 107 and the rod 132. In some embodiments, the stinger 108 of the coiled tubing string 106 may retain some bending from being stored on the reel 104 and pivoting of the loading device 130 including the rod 132 may facilitate connecting the coiled tubing connector 107 to the rod 132.

In some embodiments, the swivel 180 may include a first or lower portion 182 attached to the upper flange 164. The first portion 182 may include a first surface 182a. The swivel 180 may also include a second or upper portion 184 attached to the loading device flange 170. The second portion 184 may include a second surface 184a. The first and second surfaces 182a, 184a may be complementary, being shaped to conform to each other at an interface 186. In some embodiments, as illustrated, the first surface 182a may be concave and the second surface 184a may be convex. In some other embodiments, the first surface 182a may be convex and the second surface 184a may be concave. In some embodiments, other shapes or other types of swivels may be used. In any case, the swivel 180 may transfer the weight of the coiled tubing string 106 and the riser tube 140 to the swing arm assembly 150 while allowing the loading device 130 to pivot relative to the coiled tubing string 106 and the riser tube 140. The swivel 180 may transfer loads across the interface 186 between the complementary first and second surfaces 182a, 184a of the first and second portions 182, 184 of the swivel 180. Load transfer may occur from the second portion 184 coupled to the housing 134 via the loading device flange 170 to the first portion 182 coupled to the swing arm assembly 150 via the upper flange 164.

Moving the swing arm assembly 150 toward the first position involves rotating the swing arm assembly 150. This may be accomplished using the swing arm piston assembly 154 and moving the swing arm assembly 150 from a second position more adjacent the frame 122 toward the first position wherein the swing arm assembly 150 extends more outwardly from the frame 122 toward or adjacent the injector axis 115. The first position of the swing arm assembly 150 may align the support device 160 and the loading device 130 along injector axis 115. In the second position, the swing arm assembly 150 may be secured to prevent interference of the swing arm assembly 150, the support device 160, and the loading device 130 with ongoing operations along the path of injector axis 115. The swing arm assembly 150 may be secured in the second position for moving the test fixture 120.

With reference to FIGS. 8A and 8B, a schematic illustration of a control system including a hydraulic circuit for operating a test fixture is shown. Control system 200 may be disposed to control operation of the test fixture 120. The control system 200 may use hydraulic power to operate hydraulic actuators and controls. In one or more embodiments, the control system 200 may use electrical power to operate electrical actuators and controls. In one or more embodiments, the control system 200 may use pneumatic power to operate pneumatic actuators and controls. In one or more embodiments, a combination of hydraulic, electrical, and/or pneumatic power, actuators, and controls may be used.

Referring to FIG. 3 and with on-going reference to FIGS. 8A and 8B, the test fixture 120 may include a local control panel 201 to interface with input/output hydraulic lines 202, 204, 206, 208 to control operation of the test fixture 120. The control system 200 is in fluid communication with the rod end 136 of the loading device 130 via hydraulic line 202, and the control system 200 is in fluid communication with the bore end 138 of the loading device 130 via hydraulic line 204. In one or more embodiments, the control system 200 may be in fluid communication with the rod end 157 of the swing arm piston assembly 154 via hydraulic line 206, and the control system 200 may be in fluid communication with the bore end 158 of the swing arm piston assembly 154 via hydraulic line 208. In this way, the control system 200 may control the loading device 130 and the swing arm piston assembly 154.

The control system 200 may provide three modes of operation useful for operating the test fixture 120 to test the coiled tubing injector 110. A first mode may be a manual mode wherein the loading device 130 may be manually actuated to apply a force on the coiled tubing string 106 installed in the coiled tubing injector 110 and/or to position the loading device 130 during setup of the test fixture 120, during installation of the coiled tubing string 106, and/or in preparation for a subsequent test operation. In one or more embodiments, the loading device 130 may be actuated by an operator using the manual mode. A second mode may be a constant force (or automatic) mode wherein the loading device is actuated automatically to function as a constant force generator acting on the coiled tubing string 106 installed in the coiled tubing injector 110. A third mode may be a non-operating, parked, or locked mode wherein the loading device 130 is locked in place.

In the constant force mode, the loading device 130 may apply a constant force on the coiled tubing string 106 as the coiled tubing string 106 is lifted or lowered by the loading device 130. In one or more embodiments, the control system 200 automatically regulates a differential hydraulic fluid pressure in the loading device 130 between the rod end 136 and the bore end 138 using the hydraulic line 202 and the hydraulic line 204, respectively, to apply the constant force via constant supply pressure whether the loading device 130 is set to extend or retract. The constant force mode may simulate use of the coiled tubing injector 110 in an actual well wherein the coiled tubing string 106 is subjected to a first force imbalance that may apply downward force on the coiled tubing string 106 (e.g., in a pipe heavy condition wherein a weight of the coiled tubing string 106 exceeds an upward force due to wellbore pressure) or a second force imbalance that may apply upward force on the coiled tubing string 106 (e.g., in a snubbing operation or pipe light condition wherein the upward force due to wellbore pressure exceeds the weight of the coiled tubing string 106).

In one or more embodiments, the control system 200 includes multiple hydraulic sections, which may include a hydraulic supply section feeding the other sections, a constant force section for constant force mode, a manual control section for manual mode, a hydraulic return section receiving and returning the hydraulic fluid to the one or more supply tanks, and a swing arm piston assembly section for actuating the swing arm piston assembly 154 of the swing arm assembly 150.

Beginning with the hydraulic supply section, a first hydraulic power unit (HPU) 210 includes a fixed displacement pump 212. A second HPU 220 includes a variable displacement pump 222. In one or more embodiments, the first HPU 210 may be used as a standalone power supply, and in other embodiments HPU 220 may be used as a standalone power supply. In other embodiments, multiple HPU's of either type are combined to provide hydraulic power. In one or more embodiments, the first and/or second HPU's may be integral with the test fixture 120 and/or the control system 200. In one or more embodiments, the first and/or second HPU's 210, 220 may function as an external power supply in the sense that the first and second HPU's 210, 220 are not an integral part of either the test fixture 120 or the control system 200. The first and/or second HPU's 210, 220 may provide hydraulic fluid supply and return lines, or paths, connected to on-board hydraulic fluid supply tanks of the first and/or second HPU's 210, 220 and/or the control system 200. In one or more embodiments, the hydraulic supply section may provide hydraulic fluid at a stable pressure that meets or exceeds a pressure level needed to operate the control system 200. In one or more embodiments, the hydraulic supply section may provide an adequate source of hydraulic fluid in one or more supply tanks or reservoirs to supply all components of the control system 200. In one or more embodiments, the hydraulic supply section may provide hydraulic fluid at a flow rate that meets or exceeds a flow rate needed to operate the control system 200 within a specified range of operating pressure. In one or more embodiments, the hydraulic supply section may provide hydraulic lines and connectors to supply and receive hydraulic fluid to and from the control system 200. In one or more embodiments, the hydraulic supply section may provide internal overload, or overpressure, safety devices, for the first and second HPU's 210, 220 as known in the art.

The first HPU 210 may be connected to an accumulator system 230 for enabling the fixed displacement pump 212 to provide hydraulic fluid at a stable pressure while allowing pump unloading when flow demand is low. In FIG. 8B, the accumulator system 230 is shown as a standalone unit. In some embodiments, the accumulator system 230 may be integrated within the first HPU 210. In some embodiments, the accumulator system 230 may include additional components including one or more hydraulic lines, unloading valves, check valves, and/or isolation, or shutoff valves.

The second HPU 220 may be connected to a pressure compensator valve 240 used to control an output pressure of the variable displacement pump 222. In FIG. 8B, the pressure compensator valve 240 is shown separate from the second HPU 220 to remotely control output pressure of the variable displacement pump 222. In some embodiments, the pressure compensator valve 240 may be integrated within the second HPU 220. In some embodiments, the pressure compensator valve 240 may be optional.

Outputs from the accumulator system 230 and/or the pressure compensator valve 240 may connect at a junction to feed the remaining components of the hydraulic supply section of control system 200. The hydraulic supply section may include a filter unit 242 downstream of the HPU. The filter unit 242 may filter the hydraulic fluid to ensure necessary cleanliness of the hydraulic fluid supplied to the other sections of the control system 200. In some embodiments, the filter unit 242 may be optional. Furthermore, the hydraulic fluid may pass through a pressure-reducing valve 244 downstream of the filter unit 242. The pressure-reducing valve 244 may regulate a maximum pressure supplied to the control system 200. The pressure-reducing valve 244 may be set to a pressure slightly or moderately exceeding the pressure level needed to operate the control system 200. In some embodiments, the pressure-reducing valve 244 may be optional. In some embodiments, the first and second HPU's 210, 220 may have built-in pressure control and regulation for this purpose.

The hydraulic supply section may include a pressure gauge 246 downstream of the pressure-reducing valve 244. The pressure gauge 246 may allow precise setting of the pressure-reducing valve 244 and display actual pressure in the control system 200 any time during operation.

Referring now to the constant force section, a four-way directional control valve (DCV) or constant force control valve 250 directs fluid to one of two segments within the constant force section, either a retract segment, in a retract mode, (wherein fluid is directed to the rod end 136 of the loading device 130 via the hydraulic line 202) or an extend segment, in an extend mode, (wherein fluid is directed to the bore end of the loading device 130 via the hydraulic line 204). Thus, when the constant force mode is active, a configuration of the constant force control valve 250 controls the direction of the applied force. When the constant force control valve 250 is in a first or neutral configuration, the loading device 130 may be in a parked or locked mode. Actuating the constant force control valve 250 to a second configuration may activate the retract mode. Actuating the constant force control valve 250 to a third configuration may activate the extend mode.

The retract segment may include a retract pressure set valve 252 for maintaining a constant pressure (constant pressure translates to constant force, which is equal to pressure multiplied by internal cross-sectional area of the housing 134) on the rod end 136 of the loading device 130 and the hydraulic line 202 when the pipe heavy condition is being simulated using the retract mode. The retract pressure set valve 252 may be an unloading valve or other type of pressure reducing or pressure relieving valve known in the art. The retract segment may include a first pilot operated shut-off valve, or retract mode shift valve 254, to connect the rod end 136 of the loading device 130 to the retract pressure set valve 252 in the constant force mode. The retract segment may include a second pilot operated shut-off valve 256 to connect the bore end 138 of the loading device 130 and the hydraulic line 204 to the hydraulic fluid tank to ensure there is no back-pressure that will counteract the constant pressure on the rod end 136 in the retract mode. The retract segment may include a pressure gauge 258 downstream of the retract pressure set valve 252. The pressure gauge 258 may allow precise setting of the retract pressure set valve 252 and display actual pressure in the retract segment any time during operation.

The extend segment may include an extend pressure set valve 262 for maintaining a constant pressure (constant pressure translates to constant force, which is equal to pressure multiplied by internal cross-sectional area of the housing 134) on the bore end 138 of the loading device 130 and the hydraulic line 204 when a pipe light condition is being simulated using the extend mode. The extend pressure set valve 262 may be an unloading valve or other type of pressure reducing or pressure relieving valve known in the art. The extend segment may include a first pilot operated shut-off valve, or extend mode shift valve 264, to connect the loading device 130 to the extend pressure set valve 262 in the constant force mode. The extend segment may include a second pilot operated shut-off valve 266 to connect the rod end 136 of the loading device 130 and the hydraulic line 202 to the hydraulic fluid tank to ensure there is no back-pressure that will counteract the constant pressure on the bore end 138 in the extend mode. The extend segment may include a pressure gauge 268 downstream of the extend pressure set valve 262. The pressure gauge 268 may allow precise setting of the extend pressure set valve 262 and display actual pressure in the extend segment any time during operation.

When the constant force control valve 250 is in a first or neutral configuration, the loading device 130 is effectively in a parked or locked mode and cannot be moved unless an overload force is applied to the rod 132 that will overcome a pressure relief setting of either the retract mode shift valve 254 with an extending overload force or the extend mode shift valve 264 with a retracting overload force. This provides two important safety features including preventing the rod 132 from moving while in the manual control mode and preventing structural damage if the injector 110 is accidentally engaged momentarily.

Referring now to the manual control section, a manual pressure set valve 270 may regulate a pressure supplied to the manual control section and to a mode control valve for supplying pilot pressure to one or more mode shift valves to be described later. The manual pressure set valve 270 may be an unloading valve or other type of pressure reducing or pressure relieving valve known in the art. The manual control section may include a pressure gauge 272 downstream of the manual pressure set valve 270. The pressure gauge 272 may allow precise setting of the manual pressure set valve 270 and display actual pressure in the manual control section any time during operation. The manual control section may include a flow control valve 274 downstream of the manual pressure set valve 270 to regulate a flow rate of hydraulic fluid in manual control mode, thus limiting the rate retraction or extension of the loading device 130. In some embodiments, the flow control valve 274 may be optional.

A spring centered four-way DCV or manual control valve 280, may direct fluid to one of two segments within the manual control section, either a retract segment, in a retract mode, or an extend segment, in an extend mode. The manual retract and extend modes share the same input/output lines 202, 204 as for the constant force mode described earlier. Thus, when the manual control mode is active, a position of the manual control valve 280 controls the direction of the applied force. When the manual control valve 280 is in a first or neutral configuration, the manual control mode is inactive. Actuating the manual control valve 280 to a second configuration may activate the retract mode. Actuating the manual control valve 280 to a third configuration may activate the extend mode.

The retract segment may include a retract counterbalance valve 282 for load control in manual mode and to allow smooth and safe manual operation of the loading device 130. The retract segment may include a pilot operated shut-off valve, or retract mode shift valve 284, to connect the rod end 136 of the loading device 130 to the retract counterbalance valve 282 in the manual control mode. The extend segment may include an extend counterbalance valve 286 for load control in manual mode and to allow smooth and safe manual operation of the loading device 130. The extend segment may include a pilot operated shut-off valve, or extend mode shift valve 288, to connect the bore end 138 of the loading device 130 to the extend counterbalance valve 286 in the manual control mode. The retract and extend counterbalance valves 282, 286 may interfere with operation of the constant force mode. Therefore, the retract and extend counterbalance valves 282, 286 may be isolated from the loading device 130 by the respective mode shift valves 284, 288 when the constant force mode is active.

Referring again to the hydraulic supply section, a mode control valve 290 may regulate pilot pressure to operate the constant force section mode shift valves 254, 264 and the manual control section mode shift valves 284, 288 described earlier. The mode control valve 290 may be a manually operated four-way DCV with a three-position detent. In a first or neutral configuration, mode control valve 290 vents the mode shift valves 254, 264, 284, 288, closing those valves and effectively locking the loading device 130 in place. When the mode control valve 290 is in the first configuration, the loading device 130 cannot be moved by either the constant force section or the manual control section or by any other internal or external force applied to the loading device 130. When the mode control valve 290 is actuated to a second configuration, the constant force control mode is activated, and pilot pressure is directed to open retract and extend mode shift valves 254, 264 of the constant force section thus allowing fluid communication between the loading device 130 and the constant force control valve 250 enabling automatic or constant force control of the loading device 130. When the mode control valve 290 is actuated to a third configuration, the manual control mode is activated, and pilot pressure is directed to open retract and extend mode shift valves 284, 288 of the manual control section thus allowing fluid communication between the loading device 130 and the manual control valve 280 enabling the loading device 130 to be actuated manually.

In some embodiments, hydraulic lines 202, 204 may include shut-off, or isolation valves 292, 294, that allow the loading device 130 to be completely isolated or disconnected from the hydraulic system for maintenance, repair, or other reasons.

Referring now to the swing arm piston assembly section, a four-way DCV, or swing arm control valve 300 controls actuation of the swing arm piston assembly 154 of the swing arm assembly 150. In a first configuration, the swing arm control valve 300 directs fluid to the rod end 157 of the swing arm piston assembly 154 via the hydraulic line 206 to retract the swing arm piston assembly 154 and rotate the swing arm assembly 150 to the first position. In a second configuration, the swing arm control valve 300 directs fluid to the bore end 158 of the swing arm piston assembly 154 via the hydraulic line 208 to extend the swing arm piston assembly 154 and rotate the swing arm assembly 150 to the second position. The swing arm piston assembly section may include a swing arm piston assembly pressure set valve 302 upstream of the swing arm control valve 300 that regulates a pressure supplied to the swing arm piston assembly section. The pressure set valve 302 may be an unloading valve or other type of pressure reducing or pressure relieving valve known in the art. The swing arm piston assembly section may include a pressure gauge 304 downstream of the swing arm piston assembly pressure set valve 302. The pressure gauge 304 may allow precise setting of the swing arm piston assembly pressure set valve 302 and display actual pressure in the swing arm piston assembly section any time during operation. The swing arm piston assembly section may include first and second counterbalance valves 306, 308 on respective hydraulic lines 206, 208 to prevent unwanted movement of the swing arm assembly 150.

Referring now to the hydraulic return section, this section may receive hydraulic fluid from multiple of sections of control system 200. The hydraulic return section may receive fluid from the hydraulic supply section via the accumulator system 230, the pressure compensator valve 240, and the mode control valve 290. Furthermore, the return section may receive fluid from the constant force section via the constant force control valve 250, the retract pressure set valve 252, and the extend pressure set valve 262. Furthermore, the return section may receive fluid from the manual control section via the manual control valve 280. Furthermore, the return section may receive fluid from the swing arm piston assembly section via the swing arm control valve 300. The hydraulic return section may return the received hydraulic fluid to the one or more supply tanks of the first and second HPU's 210, 220.

Now that the design of the test fixture 120 and the control system 200 are described, explanation will move to various setup and operating steps for a test of the coiled tubing injector 110 using the coiled tubing string 106.

In some embodiments, before beginning setup of the test fixture 120, the coiled tubing unit 100, the coiled tubing injector 110, and the test fixture 120 are positioned adjacent to each other. The coiled tubing injector 110 is mounted on the frame 122 of the test fixture 120, and the coiled tubing string 106 is engaged by the injector head 112 to connect the coiled tubing string 106 between the coiled tubing reel 104 and the coiled tubing injector 110. Before startup of the first and/or second HPU's 210, 220, the mode control valve 290 is set to the first configuration to lock the loading device 130 in place and prevent undesired or unintentional movement.

During the setup process, the mode control valve 290 is actuated from the first configuration to the third configuration to activate the manual control mode as needed to position the loading device 130 via the manual control valve 280 as described earlier. The mode control valve 290 is returned to the first configuration when movement of the loading device 130 is not needed or desired or is unsafe, or when the setup is complete. The setup may also involve rotating the swing arm assembly 150 to the first position by actuating the swing arm piston assembly 154 via the swing arm control valve 300, as described earlier. Rotating the swing arm assembly 150 pivots the loading device 130 relative to the frame 122 to the first position to align the loading device 130 with the injector head 112.

Figure 9:
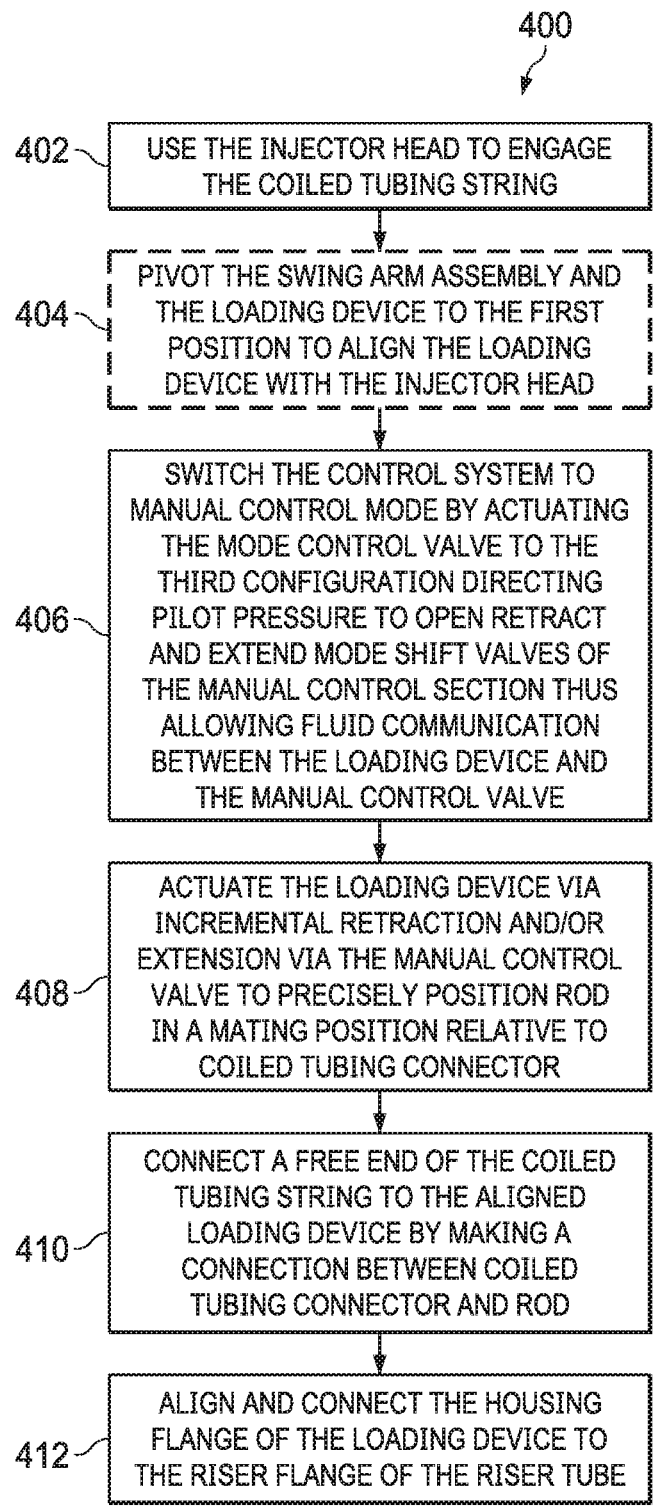
FIG. 9 is a flowchart of a method for installing a coiled tubing string into a test fixture according to some embodiments.

Once setup is complete, installation of the coiled tubing string 106 into the test fixture 120 may begin. An installation method 400 of installing the coiled tubing string 106 will now be described in reference to FIG. 9 which is a flowchart of a method for installing a coiled tubing string into a test fixture. First, at block 402, the injector head 112 may be used to engage the coiled tubing string 106, and the coiled tubing injector 110 may be actuated to lower the coiled tubing string 106 through the riser tube 140 to a position that enables the coiled tubing connector 107 to be connected to the rod 132 of the loading device 130. At block 404, if in the second position, the swing arm assembly 150 and the loading device 130 may be pivoted to the first position to align the loading device 130 with the injector head 112. At block 406, the control system 200 may be switched to manual control mode by actuating the mode control valve 290 to the third configuration directing pilot pressure to open retract and extend mode shift valves 284, 288 of the manual control section thus allowing fluid communication between the loading device 130 and the manual control valve 280. At block 408, the loading device 130 may be actuated via incremental retraction and/or extension via the manual control valve 280 to precisely position the rod 132 in a mating position relative to the coiled tubing connector 107. At block 410, a free end of the coiled tubing string 106 may be connected to the aligned loading device 130 by making a connection between the coiled tubing connector 107 and the rod 132. In one or more embodiments, the connection may be made-up by an operator, a field hand, or another crewmember. Once the coiled tubing connector 107 is coupled to the rod 132, at block 412, the riser flange 142 may be aligned with and connected to the housing flange 135 via controlled movement of rod 132 of loading device 130 to bring housing flange 135 and associated assembly in mating position with riser flange 142. The riser flange 142 and the housing flange 135 may be directly connected to each other or indirectly connected using a riser extension having upper and lower flanges configured to connect to the riser flange 142 and the housing flange 135, respectively (not shown). In any case, connecting the riser flange 142 to the housing flange 135 couples the riser tube 140 to the loading device 130. Upon connection of riser flange 142 to housing flange 142, support device 160 no longer supports loading device 130 and receives no loading during testing operations.

Figure 10:
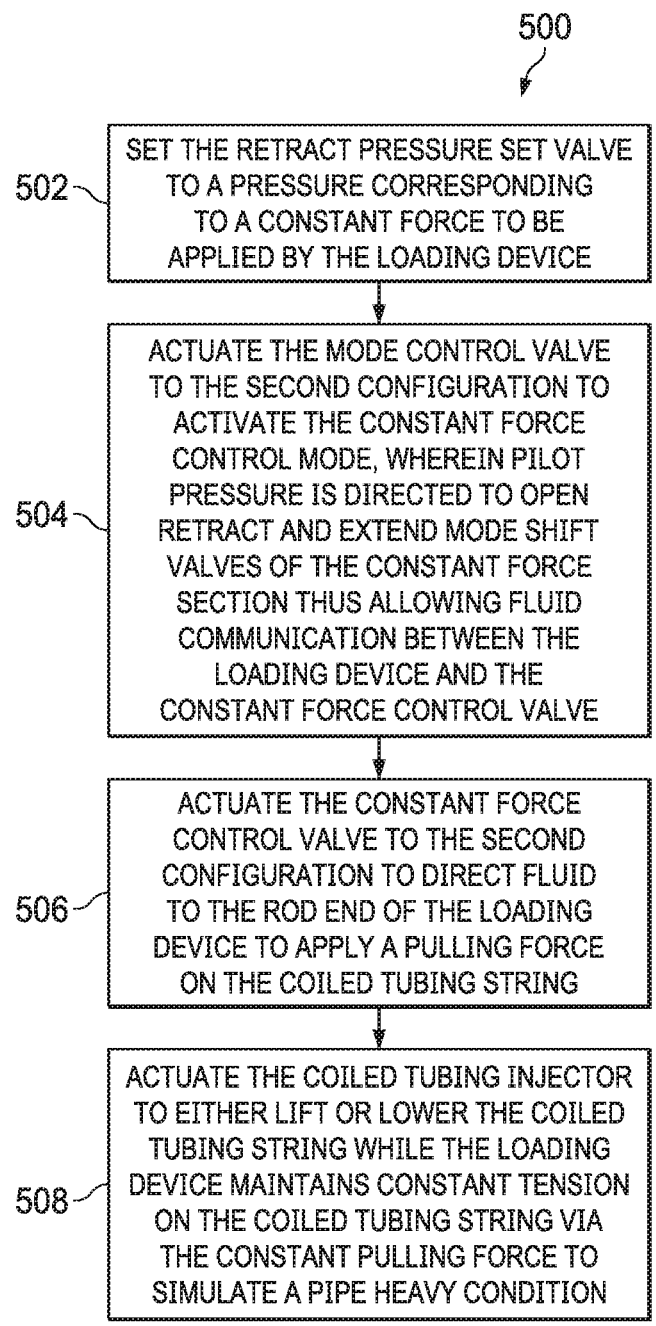
FIG. 10 is a flowchart of a first method for testing a coiled tubing injector using a test fixture according to some embodiments.

A first test method 500 of testing the coiled tubing injector 110 will now be described in reference to FIG. 10 which is a flowchart of a first method for testing a coiled tubing injector using a test fixture. Specifically, embodiments of the method 500 may involve testing the coiled tubing injector 110 using a pulling force to simulate a pipe heavy condition. In particular, a pulling force may be applied to the coiled tubing string 106 via retraction of the loading device 130. Once the coiled tubing string 106 is installed in the test fixture 120, the retract pressure set valve 252 may be set to a pressure corresponding to a constant force to be applied by the loading device 130 at block 502. In some embodiments, the constant force may be applied by maintaining a constant pressure level on the rod end 136 of the loading device 130, the pressure level being determined based on the relationship between force, pressure, and cross-sectional area of the loading device 130 as noted earlier. In the retract mode, the extend pressure set valve 262, which is not in use, may be bypassed by the second pilot operated shut-off valve 266.

To begin the test, at block 504, the mode control valve 290 may be actuated to the second configuration to activate the constant force control mode, wherein pilot pressure is directed to open retract and extend mode shift valves 254, 264 of the constant force section. Opening retract and extend mode shift valves 254, 264 may allow fluid communication between the loading device 130 and the constant force control valve 250 enabling automatic or constant force control of the loading device 130, as described earlier. At block 506, the constant force control valve 250 may be actuated to the second configuration to direct fluid to the retract segment of the constant force section to activate the retract mode. In the retract mode, the fluid may be directed to the rod end 136 of the loading device 130 via the retract pressure set valve 252, the retract mode shift valve 254, and the hydraulic line 202. Actuating the loading device 130 by pressurizing the rod end 136 may act to retract the piston rod 132. Furthermore, the bore end 138 of the loading device 130 may be connected directly to the one or more supply tanks of the first and/or second HPU's 210, 220 via the extend mode shift valve 264 and the second pilot operated shut-off valve 266. Thus, the loading device 130 may provide the constant pulling force prescribed for the test independent of a position of the cylinder rod 132. At block 508, the coiled tubing injector 110 may lift the cylinder rod 132, via the coiled tubing string 106, to the extent of its stroke or lower the cylinder rod 132, via the coiled tubing string 106, while the loading device 130 maintains constant tension on the coiled tubing string 106 via the constantly applied retraction force of the loading device 130. As such, the test simulates a relative weight of the coiled tubing string 106 applying the relative downward constant force on the coiled tubing injector 110 during both lifting and lowering functions of the coiled tubing injector 110.

Figure 11:
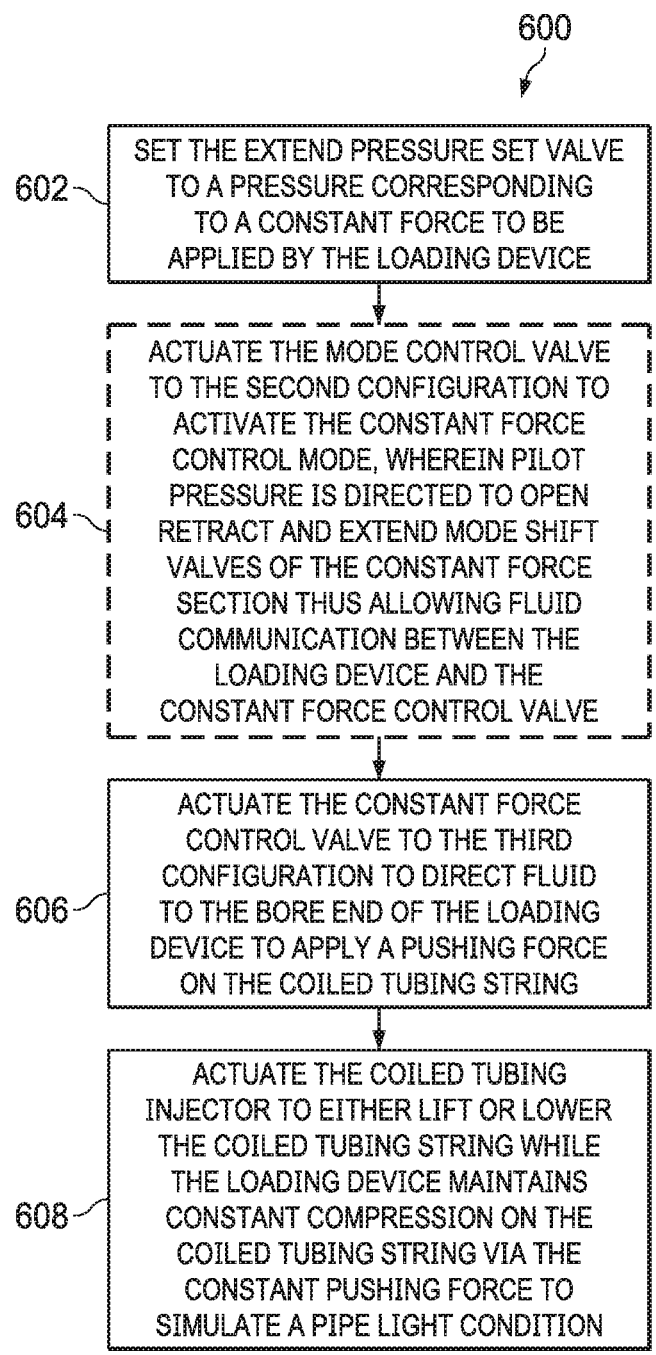
FIG. 11 is a flowchart of a second method for testing a coiled tubing injector using a test fixture according to some embodiments.

A second test method 600 of testing the coiled tubing injector 110 will now be described in reference to FIG. 11 which is a flowchart of a second method for testing a coiled tubing injector using a test fixture. Specifically, embodiments may involve switching to an alternative test of the coiled tubing injector 110 wherein the loading device 130 may push at a constant force on the coiled tubing string 106 to simulate a snubbing operation. In this case, at block 602, the extend pressure set valve 262 may be set to a pressure corresponding to a constant force to be applied by the loading device 130. In the extend mode, the retract pressure set valve 252, which is not in use, may be bypassed by the first pilot operated shut-off valve 256. If in the first configuration, at block 604, the mode control valve 290 may be actuated to the second configuration to activate the constant force control mode, as described in the previous test. If the mode control valve 290 remains in the second configuration from a prior test, then block 604 may be skipped. In either case, at block 606, the constant force control valve 250 may be actuated to the third configuration to direct fluid to the extend segment of the constant force section to activate the extend mode. In the extend mode the fluid may be directed to the bore end 138 of the loading device 130 via the extend pressure set valve 262, the extend mode shift valve 264, and the hydraulic line 204. Actuating the loading device 130 by pressurizing the bore end 138 may act to extend the piston rod 132. Furthermore, the rod end 136 of the loading device 130 may be connected directly to the one or more supply tanks of the first and/or second HPU's 210, 220 via the retract mode shift valve 254 and the first pilot operated shut-off valve 256. Thus, the loading device 130 may provide the constant pushing force prescribed for the test independent of a position of the cylinder rod 132. At block 608, the coiled tubing injector 110 may lift the cylinder rod 132, via the coiled tubing string 106, to the extent of its stroke or lower the cylinder rod 132, via the coiled tubing string 106, while the loading device 130 maintains constant compression on the coiled tubing string 106 via the constantly applied extension force of the loading device 130. As such, the test may simulate a relative pressure of the wellbore applying the relative upward constant force on the coiled tubing injector 110 during both lifting and lowering functions of the coiled tubing injector 110.

At any time during the above tests, the constant force control valve 250 and/or the mode control valve 290 may be actuated to their first configurations to disable the constant force mode and lock the loading device 130 in place. To uninstall the coiled tubing string 106 from the test fixture 120, the steps of the installation process described earlier may be implemented in a logical reverse order, starting with actuating the mode control valve 290 to the third configuration to activate the manual control mode and thereafter extending or retracting the loading device 130, as needed, via the manual control valve 280 to move the rod 132 to a position relieving any tension or compression force, respectively, on the coiled tubing string 106 to allow for safe disconnection. Next, the riser flange 142, the housing flange 135, and optionally, the riser extension can be disconnected. Next, the free end of the coiled tubing string 106 may be disconnected from the loading device 130 by breaking out the connection between the coiled tubing connector 107 and the rod 132. Thereafter, the swing arm assembly 150 may be rotated to the second position for storage or transport of the test fixture 120. Rotating the swing arm assembly 150 pivots the loading device 130 relative to the frame 122 to the second position to move the loading device 130 away from the free end of the coiled tubing string 106. Thereafter, in one or embodiments, the injector head 112 may be utilized to inject the coiled tubing string 106 into a well. At this point, the steps of the setup process may be reversed to remove the coiled tubing string from the injector head 112 of the coiled tubing injector 110 and so on.

Any one of the foregoing embodiments may include any one or more of the following elements, alone or in combination with other elements.

The present disclosure provides for many different embodiments. In one embodiment, a coiled tubing system is provided. The coiled tubing system includes a coiled tubing injector support tower having an upper end and a lower end; a coiled tubing injector disposed at the upper end of the support tower; a loading device supported by the support tower, the loading device including a rod end and a bore end; and a control system in fluid communication with a loading device. In one or more embodiments, the control system includes a hydraulic supply section including a hydraulic fluid reservoir and a hydraulic power unit. In one or more embodiments, the control system includes a constant force section in fluid communication with the hydraulic supply section and the loading device. In one or more embodiments, the constant force section includes a first control valve, wherein in a first configuration, the first control valve blocks fluid communication between the hydraulic supply section and both the rod end and the bore end of the loading device, wherein in a second configuration, the first control valve allows fluid communication between the hydraulic supply section and the rod end of the loading device, and wherein in a third configuration, the first control valve allows fluid communication between the hydraulic supply section and the bore end of the loading device. In one or more embodiments, the control system includes a manual control section in fluid communication with the hydraulic supply section and the loading device. In one or more embodiments, the manual control section includes a second control valve, wherein in a first configuration, the second control valve blocks fluid communication between the hydraulic supply section and both the rod end and the bore end of the loading device, wherein in a second configuration, the second control valve allows fluid communication between the hydraulic supply section and the rod end of the loading device, and wherein in a third configuration, the second control valve allows fluid communication between the hydraulic supply section and the bore end of the loading device.

In one or more embodiments, the control system includes a hydraulic return section in fluid communication with the constant force section and the manual control section. In one or more embodiments, the constant force section includes a first pilot operated shut-off valve in fluid communication with the rod end of the loading device. wherein the manual control section includes a second pilot operated shut-off valve in fluid communication with the rod end of the loading device. In one or more embodiments, the control system includes a third control valve, wherein in a first configuration, the third control valve allows fluid communication between both the first and second pilot operated shut-off valves and the hydraulic return section, wherein in a second configuration, the third control valve allows fluid communication between the first pilot operated shut-off valve and the hydraulic supply section, and wherein in a third configuration, the third control valve allows fluid communication between the second pilot operated shut-off valve and the hydraulic supply section.

While various embodiments have been illustrated in detail, the disclosure is not limited to the embodiments shown. Modifications and adaptations of the above embodi-

What is claimed:

1. A coiled tubing system comprising:
   a coiled tubing unit with a coiled tubing string carried by the unit, the coiled tubing string having a stinger end;
   an injector support frame having an upper end and a lower end;
   a coiled tubing injector disposed at the upper end of the support frame and engaging the coiled tubing string; and
   a loading device supported between the coiled tubing injector and the lower end of the frame, the loading device attached to the stinger end of the coiled tubing string, further comprising:
   a support device having a swivel for pivotally supporting the loading device relative to the frame.

2. The coiled tubing system of claim 1, further comprising:
   a riser tube disposed between the upper end of the frame and the loading device and coupling a housing of the loading device to a base of the coiled tubing injector, the coiled tubing string extending through the riser.

3. The coiled tubing system of claim 1, wherein the loading device comprises a fluid cylinder assembly having a piston rod extending from a piston and disposed to slide axially in a piston housing.

4. The coiled tubing system of claim 1, wherein the loading device is elongated and extends along a loading device axis and the coiled tubing string extends from the injector along an injector head axis that is substantially co-axial with the loading device axis.

5. The coiled tubing system of claim 1, further comprising a support device attached to the swing arm assembly, the support device supporting the loading device, the support device having a cylinder in which the loading device is received, and a swivel mounted on the cylinder and permitting relative movement between a swing arm assembly and the riser tube.

6. A coiled tubing system comprising:
   a coiled tubing unit with a coiled tubing string carried by the unit, the coiled tubing string having a stinger end;
   an injector support frame having an upper end and a lower end;
   a coiled tubing injector disposed at the upper end of the support frame and engaging the coiled tubing string; and
   a loading device supported between the coiled tubing injector and the lower end of the frame, the loading device attached to the stinger end of the coiled tubing string, further comprising:
   a swing arm assembly pivotally attached to the frame, wherein the loading device is carried by the swing arm assembly.

7. The coiled tubing system of claim 6, further comprising:
   a swing arm piston assembly extending between the swing arm assembly and the frame for actuating movement of the swing arm assembly relative to the frame.

8. The coiled tubing system of claim 6, further comprising a support device attached to the swing arm assembly, the support device supporting the loading device, the support device having a swivel permitting relative movement between the swing arm assembly and the support device.

9. The coiled tubing system of claim 6, further comprising a riser tube disposed between the upper end of the frame and the loading device and coupling a housing of the loading device to a base of the coiled tubing injector, the coiled tubing string extending through the riser.

10. The coiled tubing system of claim 6, wherein the loading device comprises a fluid cylinder assembly having a piston rod extending from a piston and disposed to slide axially in a piston housing.

11. A coiled tubing system comprising:
    a coiled tubing injector support tower having an upper end and a lower end;
    a coiled tubing injector disposed at the upper end of the support tower;
    a swing arm assembly pivotally attached to the tower between the upper end and lower end of the tower; and
    a loading device supported by the swing arm assembly, wherein the loading device comprises a fluid cylinder assembly having a piston rod extending from a piston and disposed to slide axially in a piston housing, wherein the piston rod extends from the piston towards the upper end of the support tower.

12. The coiled tubing system of claim 11, wherein the piston rod includes a free rod end attached to a stinger end of a coiled tubing string.

13. The coiled tubing system of claim 11, further comprising a support device attached to the swing arm assembly, the support device supporting the loading device, the support device comprising a swivel.

14. A method of testing a coiled tubing injector comprising:
    supporting a loading device below a coiled tubing injector head mounted on a frame;
    pivoting the loading device relative to the frame to a first position to align the loading device with the injector head;
    utilizing the injector head to engage a coiled tubing string;
    coupling a free end of the coiled tubing string to the aligned loading device; and
    actuating the loading device to apply one of a pulling force and a pushing force to the coiled tubing string.

15. The method of claim 14, further comprising:
    lifting the coiled tubing string using the coiled tubing injector as the loading device is actuated.

16. The method of claim 14, further comprising:
    lowering the coiled tubing string using the coiled tubing injector as the loading device is actuated.

17. The method of claim 14, further comprising retracting a piston rod of the loading device to apply the pulling force to the coiled tubing string to simulate a pipe heavy condition, and extending the piston rod of the loading device to apply the pushing force to the coiled tubing string to simulate a pipe light condition.

18. The method of claim 14, further comprising:
    applying a constant pulling force and applying a constant pushing force.

19. The method of claim 18, further comprising:
    during one of the applying of the constant pulling force and the applying of the constant pushing force to the coiled tubing string, actuating the coiled tubing injector to one of lift and lower the coiled tubing string.

20. The method of claim 14, further comprising
    disconnecting the free end of the coiled tubing string from the loading device;
    pivoting the loading device to a second position relative to the frame so as to move the loading device away from the free end of the coiled tubing; and thereafter, utilizing the injector head to inject the coiled tubing string into a well.

\* \* \* \* \*